(12) United States Patent
  Ma

(10) Patent No.: US 9,039,268 B2
(45) Date of Patent: May 26, 2015

(54) BACKLIGHT UNIT WITH REFLECTION STRUCTURE FORMED ON LIGHT GUIDE PLATE AND DISPLAY DEVICE THEREOF

(71) Applicant: BOE TECHNOLOGY GROUP CO., LTD., Beijing (CN)

(72) Inventor: Ruoyu Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 16 days.

(21) Appl. No.: 13/946,060

(22) Filed: Jul. 19, 2013

(65) Prior Publication Data

US 2014/0056027 A1    Feb. 27, 2014

(30) Foreign Application Priority Data

Aug. 22, 2012    (CN) .......................... 2012 1 0301880

(51) Int. Cl.
  *F21V 7/04* (2006.01)
  *F21V 8/00* (2006.01)
(52) U.S. Cl.
  CPC ............ *G02B 6/0011* (2013.01); *G02B 6/0028* (2013.01); *G02B 6/0038* (2013.01); *G02B 6/0055* (2013.01); *G02B 6/0065* (2013.01)
(58) Field of Classification Search
  USPC ............................ 362/615, 31, 555, 558, 561
  See application file for complete search history.

(56) References Cited

U.S. PATENT DOCUMENTS

| 6,196,691 | B1 | 3/2001 | Ochiai |
| 2007/0247872 | A1 | 10/2007 | Lee et al. |

FOREIGN PATENT DOCUMENTS

| CN | 101059620 A | 10/2007 |
| CN | 101086540 A | 12/2007 |

OTHER PUBLICATIONS

First Chinese Office Action dated Mar. 12, 2014; Appln. No. 201210301880.7.
Second Chinese Office Action Appln. No. 201210301880.7; Dated Oct. 11, 2014.

*Primary Examiner* — Joseph L Williams
(74) *Attorney, Agent, or Firm* — Ladas & Parry LLP

(57) ABSTRACT

Embodiments of the invention disclose a backlight unit, including: a light guide plate, a light source member, a reflection film, wherein: the light guide plate (LGP) includes a light incident side, a light emission side and a bottom side opposite to the light emission side, the light guide plate is for emitting light entered from the light incident side through the light emission side; the light source member is disposed on the light incident side of the LGP and light emitted by the light source member enters the LGP through the light incident side of the LGP; the reflection film is at least disposed on the bottom side of the LGP and is for reflecting light back into the LGP; wherein a reflection structure is disposed on the bottom side of the LGP and a microstructure is disposed on the light emission side of the LGP.

11 Claims, 4 Drawing Sheets 401a, 401b

401d

BACKLIGHT UNIT WITH REFLECTION STRUCTURE FORMED ON LIGHT GUIDE PLATE AND DISPLAY DEVICE THEREOF

FIELD OF THE ART

Embodiments of the invention relate to a display technology, more specifically, to a backlight unit and a display device.

BACKGROUND

As the light efficiency of LCDs is relatively low, low brightness of the LCDs has been a problem bothering many designers. With the development of technologies, many solutions have been proposed with an aim of solving the problem, some of which achieved quite good effect, such as Brightness Enhancement Film (BEF). In BEF, a lot of prisms with the same configuration disposed on the BEF surface makes light of the backlight system to concentrate to the front of a user by reflection and refraction. Two BEFs having orthogonal prisms may improve the visual brightness by over 100%. Another solution is Dual-Brightness Enhancement Film (DBEF), which reflects light having a polarization direction vertical to the grid direction of a lower polarizer of the liquid crystal panel back to a light guide plate (LGP) through several layer of films, while allows light having the same polarization direction as the grid direction of the lower polarizer of the liquid crystal to pass. In the method, after the reflected light undergoes multiple reflections and refractions in the LGP, a part of the light has its vibration direction changed to the grid direction parallel with the polarizer and enters the liquid crystal layer again through the lower polarizer. However, the backlight sources in conventional technologies have a problem of optical energy being scattered. To improve the light efficiency, it is desirable that optical energy be concentrated in the vertical direction to the greatest extent.

SUMMARY

Embodiments of the invention provide a backlight unit and a display device for improving the on-axis brightness.

In one aspect, an embodiment provides a backlight unit, comprising:

a light guide plate, a light source member, a reflection film, wherein:

the light guide plate (LGP) comprises a light incident side, a light emission side and a bottom side opposite to the light emission side, the light guide plate is for emitting light entered from the light incident side through the light emission side;

the light source member is disposed on the light incident side of the LGP and light emitted by the light source member enters the LGP through the light incident side of the LGP;

the reflection film is at least disposed on the bottom side of the LGP and is for reflecting light back into the LGP;

wherein a reflection structure is disposed on the bottom side of the LGP and a microstructure is disposed on the light emission side of the LOP.

As an example, the reflection structure is a nanometer grating structure.

As an example, a cross section of the reflection structure has a triangular sawtooth shape or a rectangular sawtooth shape.

As an example, the microstructure is a plurality of protruding bars or concave grooves disposed parallel to each other and spaced apart.

As an example, the LGP comprises at least a first refraction layer, the microstructure is disposed on a side of the first refraction layer close to the light emission side.

As an example, the first refraction layer is close to the light emission side of the LGP, the LGP further comprises a second refraction layer close to the bottom side of the LOP, a refraction index of the second refraction layer is smaller than that of the first refraction layer.

As an example, the LGP comprises a third refraction layer disposed between the first refraction layer and second refraction layer, refraction indices of the second, the third and the first refraction layers are increased in this order.

As an example, the LGP further comprises a fourth refraction layer disposed on a side of the first refraction layer close to the light emission side, a refraction index of the fourth refraction layer is larger than that of the first refraction layer.

As an example, the light source member comprises a light source body, a concave minor and a side light pipe having a wedge cross section, the light source body is disposed at a focus of the concave mirror;

the side light pipe is for guiding the light emitted by the light source member to the light incident side of the LGP.

In another aspect, an embodiment of the invention further provides a display device comprising the aforementioned backlight unit.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
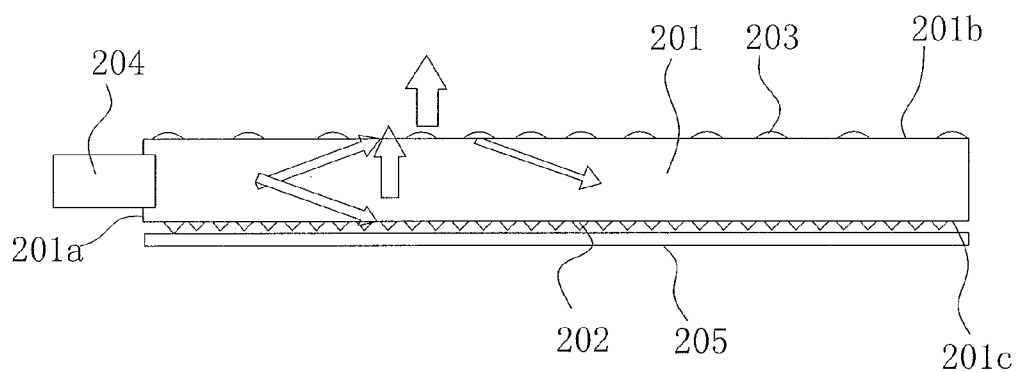
FIG. 1 schematically illustrates a configuration of a backlight unit in accordance with a second embodiment of the invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various modules. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiment 1

The embodiment describes a backlight unit comprising:

a light guide plate, a light source member, a reflection film, wherein:

the light guide plate (LGP) comprises a light incident side, a light emission side and a bottom side opposite to the light emission side, the light guide plate is used for emitting light entered from the light incident side through the light emission side;

the light source member is disposed on the light incident side of the LGP and light emitted by the light source member enters the LGP through the light incident side of the LGP;

the reflection film is at least disposed on the bottom side of the LGP and is for reflecting light back into the LGP;

a reflection structure is disposed on the bottom side of the LGP; a microstructure is disposed on the light emission side of the LGP.

The reflection structure adjusts the light entered from the light incident side of the LGP, the light is further adjusted by the microstructure on the light emission side of the LGP such that the light emitted by the light emission side of the LGP tends to be more vertical to the light emission side of the LGP and on-axis brightness is thus improved.

Embodiment 2

As illustrated in FIG. 1, the embodiment includes a configuration of embodiment 1, but more specifically:

In the embodiment, the reflection structure is a nanometer grating structure 202. A cross section of the reflection structure has a triangular sawtooth shape.

The microstructure 203 is a plurality of protruding bars disposed parallel to each other and spaced apart.

In the embodiment, the light source body is for example a LED light source.

A light from the LED light source in the light source member 204 is transformed to collimated light after passing through the concave mirror, and then enters the LGP 201 through the light incident side 201a of the LOP. The direction of the light entered the LGP 201 is first adjusted by the nanometer grating structure 202 (a part of the light leaked from the LGP 201 through the nanometer grating structure 202 is reflected back into the LGP 201 by the reflection film 205), then the light passes through the microstructure 203 on the light emission side 201b of the LGP, such that the angle between the light emitted from the light emission side 201b of the LGP and a direction vertical to the light emission side 201b of the LGP (that is, the normal direction of the light emission side 201b of the LGP) become very small, thereby increasing the on-axis brightness. In the embodiment, a range of the angle is −5° to +5°.

Figure 2:
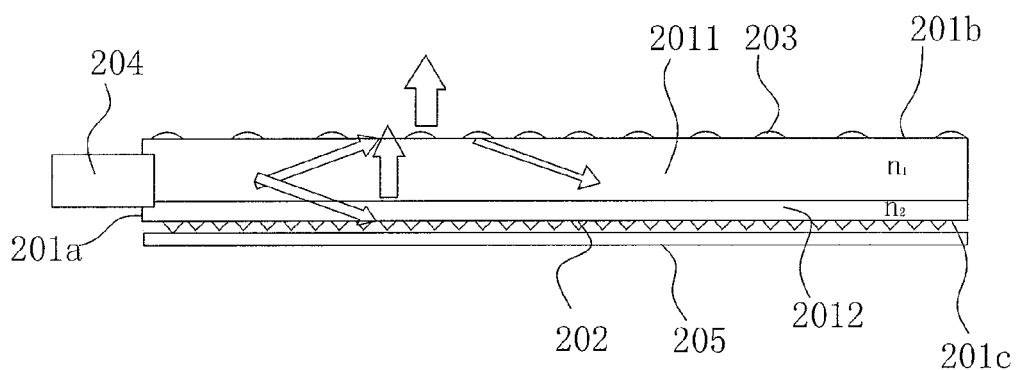
FIG. 2 schematically illustrates another configuration of a backlight unit in accordance with a second embodiment of the invention.

In the embodiment, the LGP may further have a configuration as illustrated in FIG. 2, which comprises a first refraction layer 2011 (with a refractive index of $n_1$) disposed close to the light emission side 201b of the LGP, and a second refraction layer 2012 (with a refractive index of $n_2$) disposed close to the bottom side 201c of the LGP, where the refractive index of the second refraction layer 2012 is smaller than that of the first refraction layer 2011. The microstructure 203 is disposed on a side of the first refraction layer 2011 close to the light emission side 201b. The travelling direction of the light may be controlled in a better way with LGP materials having different refraction indices.

Embodiment 3

Figure 3:
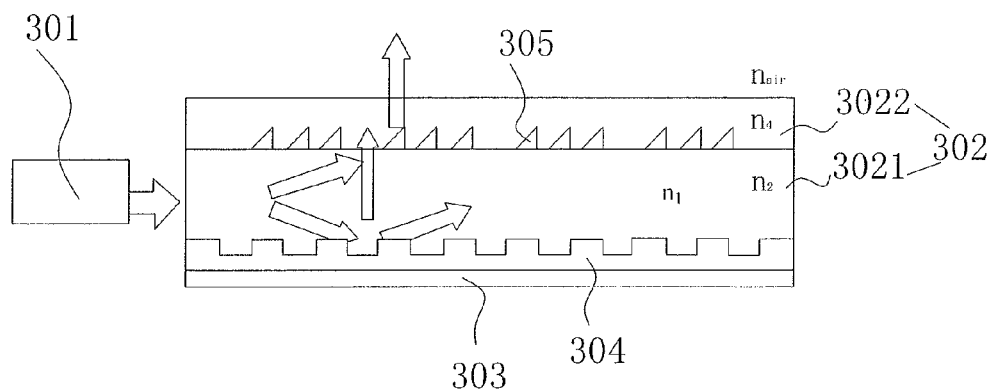
FIG. 3 schematically illustrates a configuration of a backlight unit in accordance with a third embodiment of the invention.

As illustrated in FIG. 3, the embodiment comprises a light source member 301, a LGP 302 and a reflection film 303, all of which are similar to the corresponding parts of embodiment 1. More specifically, In the embodiment, the reflection structure is a nanometer grating structure 304. A cross section of the reflection structure has a rectangular sawtooth shape.

In the embodiment, the LGP 302 comprises a first refraction layer 3021 (with a refraction index of $n_1$), the microstructure 305 is a protruding structure with a triangular sawtooth shape disposed on a side facing the light emission side of the LGP of the first refraction layer 3021. Alternatively, the LGP 302 may further comprise a fourth refraction layer 3022 (with a refraction index of $n_4$, where $n_4 < n_1$) disposed on a side, close to the light emission side of the LGP, of the first refraction layer 3021. That is to say, the fourth refraction layer 3022 covers the microstructure 305.

Figure 4:
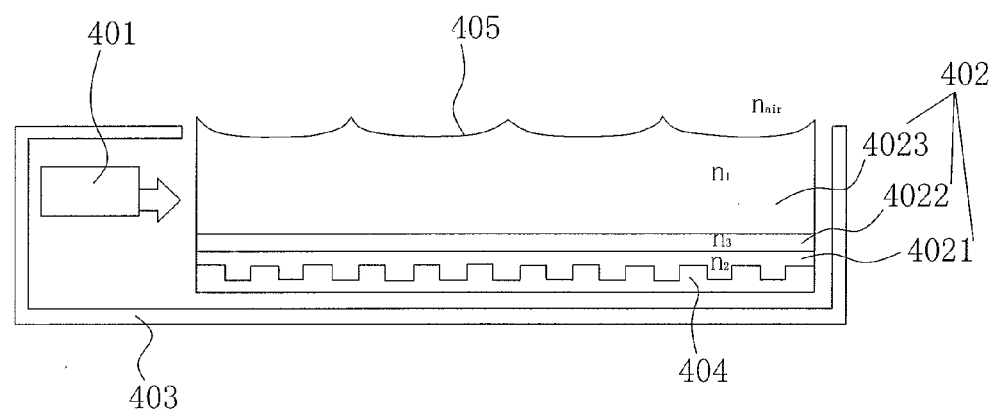
FIG. 4 schematically illustrates a configuration of a backlight unit in accordance with a fourth embodiment of the invention.

Similarly, a fourth refraction layer may also be disposed on the microstructure 305 in the embodiments illustrated in FIGS. 1, 2 and 4, so as to have better control over the light direction.

Embodiment 4

As illustrated in FIG. 4, the embodiment comprises a light source member 401, a LGP 402 and a reflection film 403, all of which are similar to the corresponding parts of embodiment 1, but more specifically, In the embodiment, the reflection structure is a nanometer grating structure 404. A cross section of the reflection structure has a rectangular sawtooth shape.

The microstructure is several arc-like grooves 405 formed parallel to each other on the light emission side of the LGP. As illustrate in FIG. 4, a cross section of the several arc-like grooves forms a continuous wave in shape.

In the embodiment, the LGP 402 comprises a first refraction layer 4023 (with a refraction index of $n_1$) disposed close to the light emission side of the LGP, a second refraction layer 4021 (with a refraction index of $n_2$) disposed close to the bottom side of the LGP and a third refraction layer 4022 (with a refraction index of $n_3$, where $n_2 < n_3 < n_1$) disposed between the first refraction layer 4023 and the second refraction layer 4021.

The nanometer grating structure 404 is formed on a side of the second refraction layer 4021 facing the reflection film 403. The microstructure is formed on a side of the first refraction layer 4023 close to the light emission side.

Figure 5:
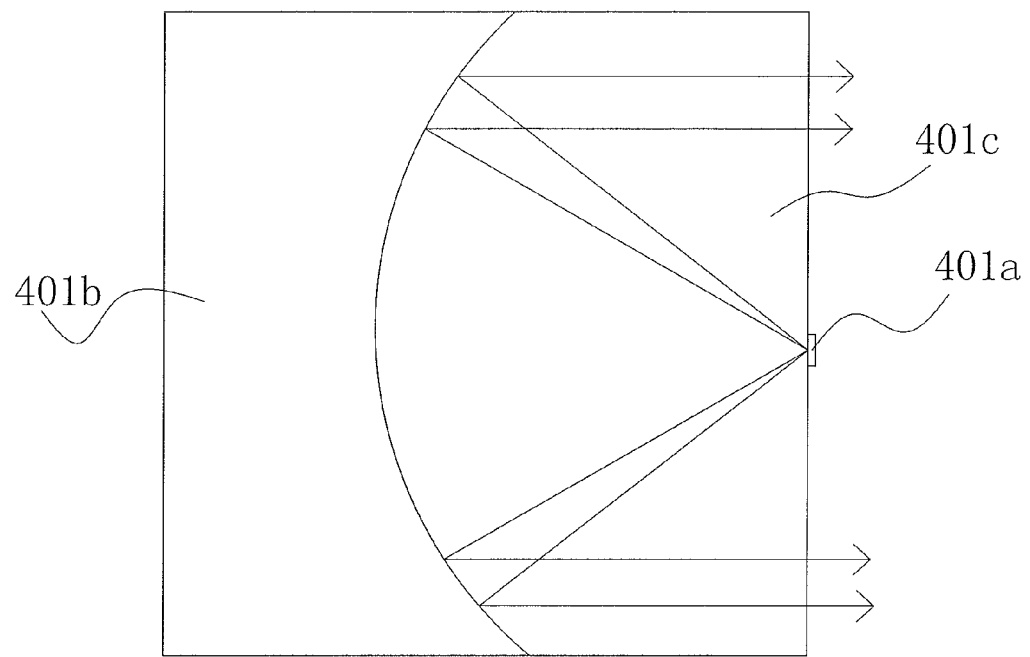
FIG. 5 schematically illustrates a configuration of a light source body and a concave mirror in accordance with the fourth embodiment of the invention.
Figure 6:
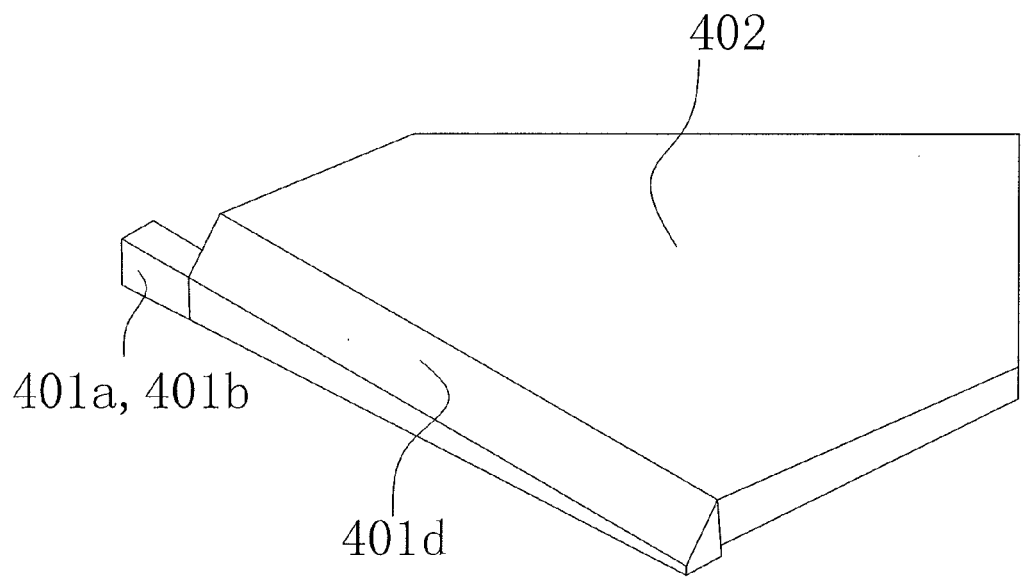
FIG. 6 schematically illustrates a configuration of a light source member and a LGP in accordance with the fourth embodiment of the invention.
Figure 7:
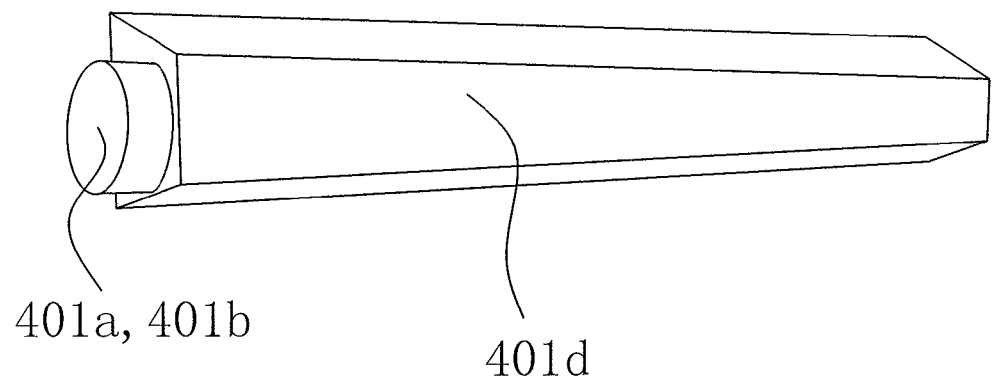
FIG. 7 schematically illustrates another configuration of a light source member of the fourth embodiment of the invention.

As illustrated in FIGS. 5 to 7, in the embodiment, the light source member 401 may comprise a light source body 401a, a concave mirror 401b and a side light pipe 401d with a wedged cross section.

The light source body 401a is located at the focus of the concave mirror 401b (for example, in the light source member as illustrated in FIG. 6, the light source body 401a and the concave mirror 401b are located in the quadrangular cylinder; in the light source member in another configuration as illustrated in FIG. 7, both the light source body 401a and the concave mirror 401b are located in elliptic cylinder).

The side light pipe 401d is for guiding the light emitted by the light source member 401 to the light incident side of the LGP 402.

As illustrated in FIG. 5, in an example, a structure 401c made of a material with high transmissivity may be disposed between the light source body 401a and the concave mirror 401b, such that the light source body 401a may be fixed at the focus of the concave mirror 401b. The light emission side of the structure made of the material with high transmissivity 401c is vertical to the collimated emission light, such that the emission light will not be refracted at the light emission side.

The light emitted by the light source body 401a forms a collimated light after being reflected by the concave mirror 401b and is output to the side light pipe 401d, which is then used to transform the light source member 401 from a dot light source to a line light source and output the light to the light incident side of the LGP 402.

In the embodiment, besides the bottom side of the LGP, the reflection film 403 can also be configured to cover the outer side of the light source member 401 and an outer side of the side of the LGP 402 opposite to the light incident side (as illustrated in FIG. 4), such that the light leaked from the bottom and the other sides of the LGP 402 as well as the light leaked from the light source member 401 may be reflected, thereby making more light enter the LGP 402. As a result, the light efficiency is improved and the brightness of the backlight module is higher.

Embodiment 5

This embodiment describes a display device, which comprises the backlight unit as described in any of Embodiments 1 to 4.

By using the above structural design in grating structure, the microstructure and the light source, the backlight module in accordance with the embodiments of the invention makes the light emitted by the backlight source concentrate along the vertical direction, thereby improving the on-axis brightness.

What are described above is related to the illustrative embodiments of the disclosure only and not limitative to the scope of the disclosure; the scopes of the disclosure are defined by the accompanying claims.

What is claimed is:

1. A backlight unit, comprising:
a light guide plate, a light source member, a reflection film, wherein:
the light guide plate (LGP) comprises a light incident side, a light emission side and a bottom side opposite to the light emission side, the light guide plate is for emitting light entered from the light incident side through the light emission side;
the light source member is disposed on the light incident side of the LGP and light emitted by the light source member enters the LGP through the light incident side of the LGP;
the reflection film is at least disposed on the bottom side of the LGP and is for reflecting light back into the LGP;
wherein a reflection structure is disposed on the bottom side of the LGP and a microstructure is disposed on the light emission side of the LGP,
wherein the LGP comprises a first refraction layer close to the light emission side of the LGP and second refraction layer close to the bottom side of the LGP, the microstructure is disposed on a side of the first refraction layer close to the light emission, and a refraction index of the second refraction layer is smaller than that of the first refraction layer.

2. The backlight unit of claim 1, wherein the reflection structure is a nanometer grating structure.

3. The backlight unit of claim 2, wherein a cross section of the reflection structure has a triangular sawtooth shape or a rectangular sawtooth shape.

4. The backlight unit of claim 1, wherein the microstructure is a plurality of protruding bars or concave grooves disposed parallel to each other and spaced apart.

5. The backlight unit of claim 1, wherein the LGP comprises a third refraction layer disposed between the first refraction layer and second refraction layer, refraction indices of the second, the third and the first refraction layer are increased in this order.

6. The backlight unit of claim 5, wherein the LGP further comprises a fourth refraction layer disposed a side of the first refraction layer close to the light emission side, a refraction index of the fourth refraction layer is larger than that of the first refraction layer.

7. The backlight unit of claim 1, wherein the LGP further comprises a fourth refraction layer disposed on a side of the first refraction layer close to the light emission side, a refraction index of the fourth refraction layer is larger than that of the first refraction layer.

8. The backlight unit of claim 1, wherein the reflection film covers the light source member, the bottom side of the LGP and a side of the LOP opposite to the light incident side.

9. The backlight unit of claim 1, wherein the light source member comprises a light source body, a concave mirror and a side light pipe having a wedged cross section,
the light source body is disposed at a focus of the concave mirror;
the side light pipe is for guiding the light emitted by the light source member to the light incident side of the LOP.

10. A display device comprising the backlight unit of claim 1.

11. The backlight unit of claim 1, wherein the reflection structure comprises a plurality of nanometer gratings, and the microstructure comprises a plurality of protruding bars or concave grooves disposed parallel to each other and spaced apart; each of the nanometer gratings extends in same direction as each of the protruding bars or each of concave grooves.

* * * * *